(No Model.) 3 Sheets—Sheet 1.

G. T. WARWICK.
BICYCLE.

No. 412,216. Patented Oct. 1, 1889.

Witnesses:

Inventor,
Geo. T. Warwick,
By
Atty's (No Model.) 3 Sheets—Sheet 2.
G. T. WARWICK.
BICYCLE.
No. 412,216. Patented Oct. 1, 1889.
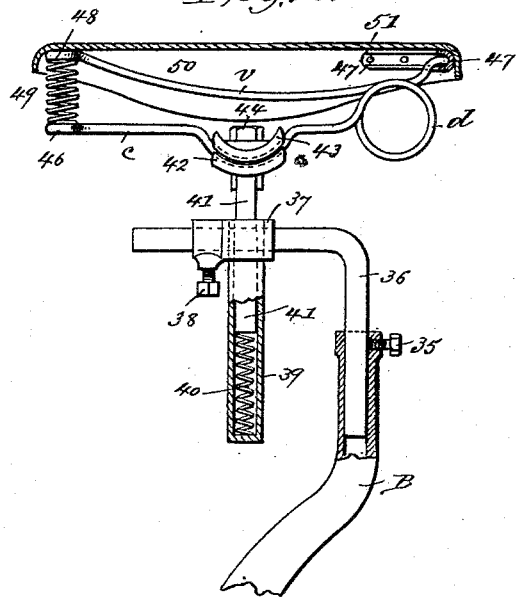
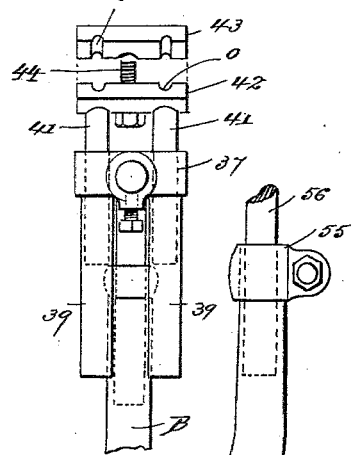
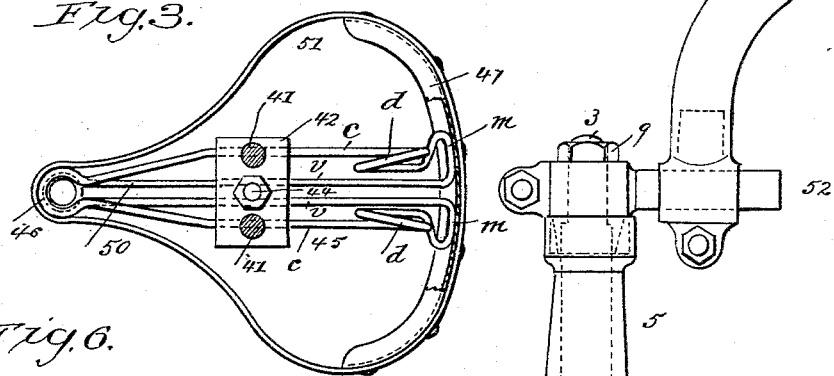
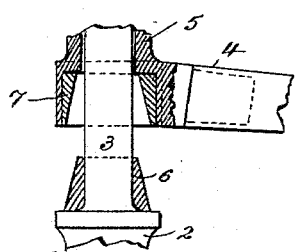
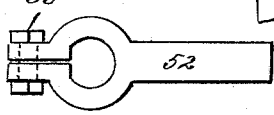
Witnesses:
J. D. Garfield
Wm. G. Bellows
Inventor,
Geo. T. Warwick
By Chaffin
Atty's
N. PETERS. Photo-Lithographer. Washington, D. C.

(No Model.) 3 Sheets—Sheet 3.

G. T. WARWICK.
BICYCLE.

No. 412,216. Patented Oct. 1, 1889.

Witnesses:
J. D. Garfield
Wm. F. Bellows

Inventor.
Geo. T. Warwick
By _____
Att'ys

UNITED STATES PATENT OFFICE.

GEORGE T. WARWICK, OF SPRINGFIELD, MASSACHUSETTS, ASSIGNOR TO THE WARWICK CYCLE MANUFACTURING COMPANY, OF SAME PLACE.

BICYCLE.

SPECIFICATION forming part of Letters Patent No. 412,216, dated October 1, 1889.

Application filed January 4, 1889. Serial No. 295,401. (No model.)

*To all whom it may concern:*

Be it known that I, GEORGE T. WARWICK, a citizen of Great Britain, residing at Springfield, in the county of Hampden and State of Massachusetts, have invented new and useful Improvements in Safety-Bicycles, of which the following is a specification.

This invention relates to bicycles, and more particularly to that class thereof designated as "safety-bicycles," for the reason that both the wheels thereof are about the same diameter, whereby the axles thereof are brought nearer the ground than in that class of machines where the front wheel of the machine is of much greater diameter than the rear wheel; and the invention consists in the peculiar construction and arrangement of various parts of the machine, all as hereinafter fully described, and pointed out in the claims.

Figure 1:
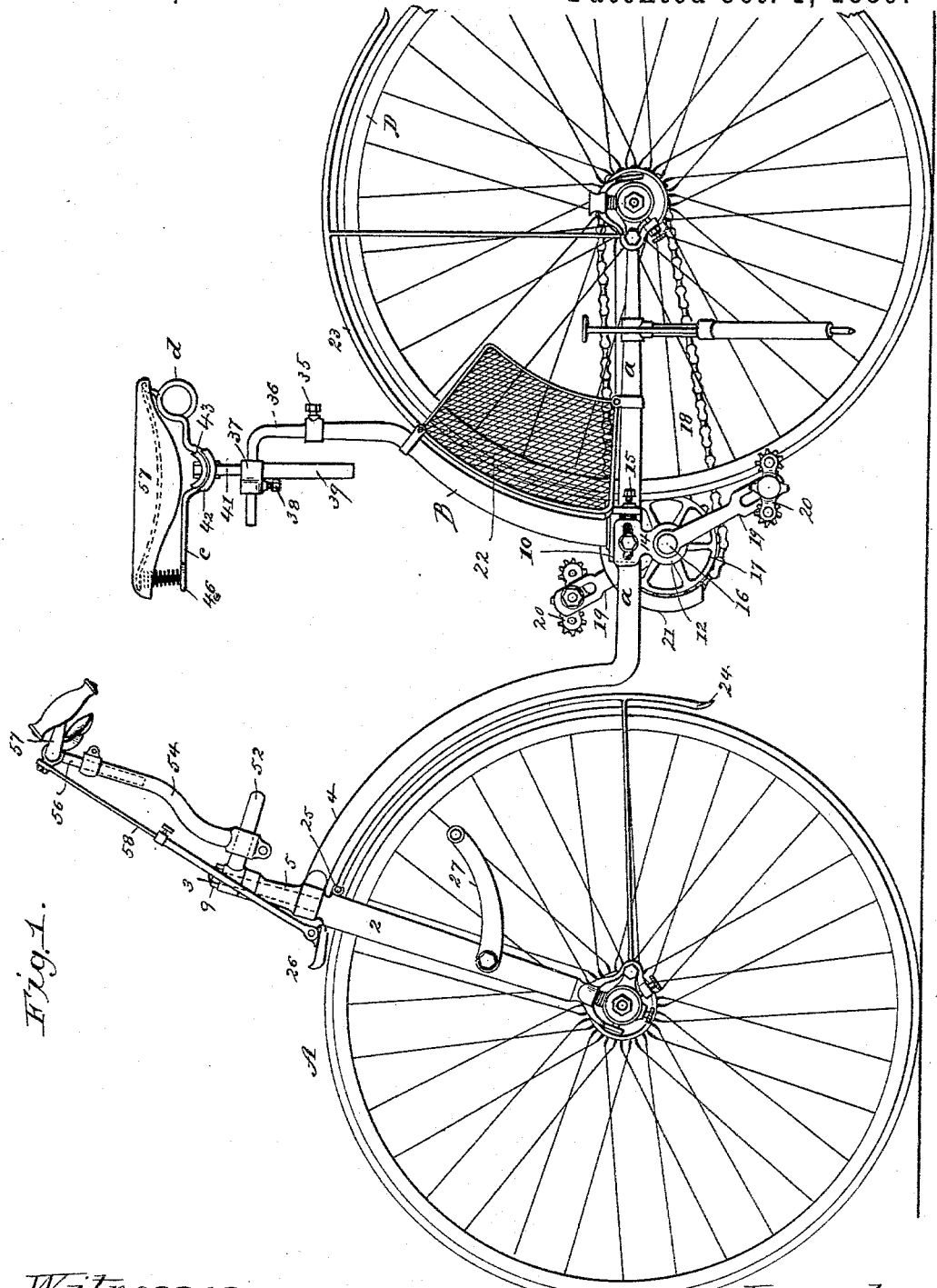
Figure 8:
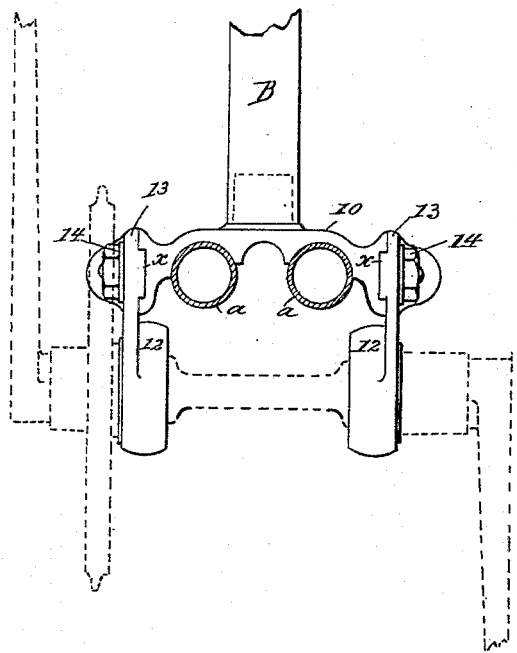
Figure 9:
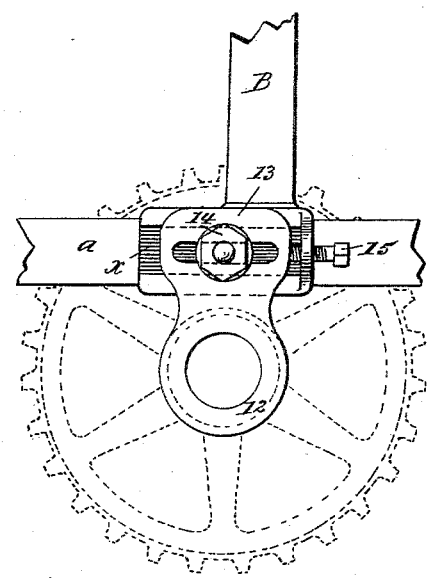
Figure 10:
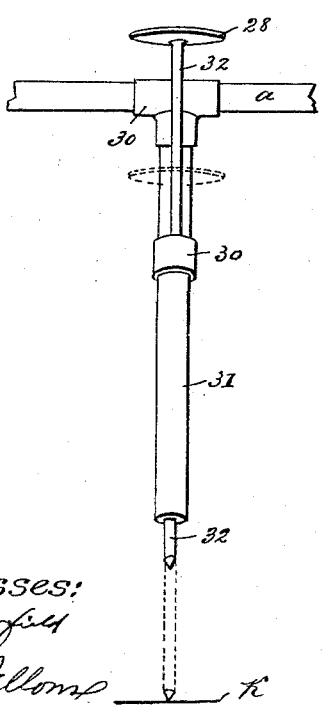
Figure 11:
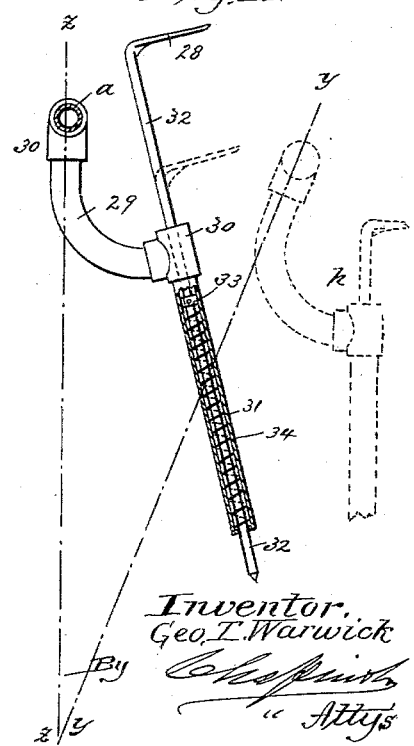

In the drawings forming part of this specification, Figure 1 is a side elevation of a safety-bicycle embodying my improvements. Fig. 2 is a side elevation, partly in section, of the saddle of the machine and of portions of its supporting parts. Fig. 3 is a bottom plan view of the saddle. Fig. 4 is a front elevation of the parts in which the saddle is supported. Fig. 5 is a side elevation of the front-fork spindle, the backbone-head and a portion of the backbone, the shaft to which the handle-bar spindle is attached, a portion of the latter spindle, and the laterally-extending connection between said shaft and fork-spindle. Fig. 6 is a side elevation of a portion of the fork-spindle and of the backbone and its head, showing parts connected therewith partly in section, which are hereinafter fully described. Fig. 7 is a plan view of a steering-lever, hereinafter fully described. Fig. 8 is an elevation of the axle-box and seat-supporting yoke, showing the arms of the rear-wheel fork in section, a portion of the seat-supporting post, and an edge view of said axle-boxes, the axle, portions of the cranks, and a sprocket-wheel being indicated in this figure by dotted lines. Fig. 9 is a side elevation of the devices illustrated in Fig. 8, and in which the sprocket-wheel is indicated by dotted lines. Fig. 10 is a side elevation of a portion of one arm of the rear-wheel fork and of a depressible mounting-step attached to said fork. Fig. 11 is a side elevation, partly in section, of said mounting-step and of the arm by which it is attached to the rear-wheel fork, a dotted-line diagram in this figure illustrating the position to which this mounting-step is brought when used for mounting the machine.

In the drawings, 2 is the front-wheel fork of the machine, and 3 the spindle thereof, and 4 is the backbone, and 5 the head of the latter, said backbone-head fitting over and upon said fork-spindle in the usual way; but to provide a bearing between said backbone-head and fork-spindle, which will permit for taking up for the wear of the parts and serve to retain the backbone-head and fork-spindle in such operative relations as will prevent any lateral swing of the end of the fork 2, to which the front wheel A is hung, a cone-shaped sleeve 6 (see Fig. 6) is fitted on the lower end of said fork-spindle 3, and in the adjoining lower end of the backbone-head 5 is placed a bushing 7, internally of cone shape and adapted to fit onto said cone-shaped sleeve 6, and in practice said bushing and sleeve are so fitted to each other that as their surfaces wear in use the backbone-head may be forced toward the shoulder of the fork 2 at the base of its spindle by turning the nut 9 on the upper end of said spindle.

The position of the assembled parts above described is indicated by dotted lines in Fig. 5.

The main saddle-supporting post B is rigidly secured to a yoke 10 by its lower end, which yoke extends transversely across the upper side of the rear-fork arms *a*, which constitute the frame of the machine between the two wheels thereof, and is rigidly brazed or otherwise secured thereto. The said yoke has a longitudinal groove *x* in each end, and to each end of said yoke is secured a shaft-box 12, on which is an arm 13, having a rib fitting said groove. The said arm 13 of the shaft-box has a longitudinal slot through it, through which the end of a bolt secured to said yoke passes, on which is a nut 14, by which the arm of the shaft-box is rigidly secured to the end of the yoke. In the rear end of that part of the yoke to which the arm of the shaft-box is attached is a screw-bolt 15, which bears against one edge of the said box-arm, whereby the shaft-boxes and shaft are given a movement in a direction from the rear axle supporting the rear wheel of the machine, and thereby the crank-shaft 16 and the sprocket-wheel 17, on which the drive-chain 18 is carried, are so adjusted that a proper strain or tension is imparted to said drive-chain, and after such adjustment the shaft-boxes are secured in place on the ends of the yoke 10 by screwing up the nuts 14.

In Fig. 1, 19 are the crank-arms secured to the ends of said shaft 16, and 20 are the usual foot-pedals attached to said crank-arms. A dirt-guard 21 is secured over the upper edge of said sprocket-wheel, and a dress-shield, of wire-cloth or other suitable material 22, is secured to the saddle-post B and to the rear-wheel fork $a$ and covers that portion of the rim of the rear wheel D directly back of the saddle-post, and a dirt-guard 23 is secured to said fork, as shown, and extends over the upper part of said rear wheel. A dirt-guard 24 is also properly secured over the rear portion of the front wheel A, the upper end of said dirt-guard 24 being secured to an eye 25 on the rear side of the fork 2, and the brake-shoe 26 has its rear end pivotally attached to said eye 25 by a suitable bolt passing therethrough, whereby said brake-shoe is permitted to have a vibratory motion toward and from the rim of said front wheel.

An arm 27 is secured on each side of the fork 2, having on its upper end a suitable foot-rest.

In order to provide improved convenient means for mounting the machine, a depressible mounting-step 28 is attached to one arm of the rear fork $a$, and said mounting-step and supporting devices are constructed and arranged as follows:

An outwardly-curved arm 29 is secured to a T-piece 30, the latter being rigidly secured on the fork-arm $a$. To the lower end of said arm 29 is rigidly secured a second T-piece 30, and to the latter is secured a downwardly-extending tubular spring-case 31, the lower end of which has a contracted opening, through which extends the leg 32 of the mounting-step 28. A spiral spring is placed within said spring-case 31 and bears against the lower inner end thereof, and the step-leg 32 passes through said spiral spring and through the lower end of said case, and a collar 33 is secured on said step-leg and forms an abutment for the upper end of said spiral spring, the latter being indicated by 34.

In Fig. 11, $z$ indicates a vertical line drawn through the fork-arm $a$, to which said T-piece 30 is rigidly attached, and said figure indicates the normal position of the mounting-step leg 32 when the machine is in an upright position and the front and rear wheels A and D thereof are in a like vertical plane to said line $z$; and hence it is obvious that with the machine in said position the mounting-step leg and the spring-case 31, in which it operates, stand in a position inclined to said vertical line, and the lower end of said leg is held upward clear from the ground by the said spring 34. To most conveniently mount the machine the latter is inclined laterally toward the rider before mounting, it being understood, of course, that said rider stands on the side of the machine to which said mounting-step is attached, and by so inclining the machine the mounting-step is made to take a position substantially such as is indicated by the dotted-line diagram Fig. 11, the spread of the upper ends of the lines $z$ and $y$ in said figure showing about the extent of the lateral movement of the upper part of the machine to bring the mounting-step and its leg to the position shown by said diagram $h$, in which it is seen that the step-leg takes substantially a vertical position. The rider now mounts by placing his foot on the step 28, thereby forcing the same and the step-leg downwardly and causing its lower pointed end to engage with the ground K, as indicated in Fig. 10, and said step-leg thus serves to momentarily steady the machine until the rider has fully mounted it, and by such action he brings the machine to a proper vertical position preparatory to starting it, the mounting-step and its leg meanwhile being thrown upward away from the ground by the coil-spring 34, and when the machine is in an operative position the leg of the step is inclined to the plane of the rotation of the wheels A and D.

The above-referred-to saddle-post B extends upwardly slightly higher than the wheels of the machine, and has a screw-bolt 35 through its side, and is preferably of tubular form, and is thus adapted to receive the end of the saddle-supporting arm 36, which end is secured adjustably in the upper end of the saddle-post B by said screw-bolt 35, and to the horizontal portion of said saddle-arm the saddle-supporting devices below described are connected. The said adjustable feature of the saddle-supporting arm 36 provides for adjusting the saddle vertically.

The above-referred-to saddle-supporting devices consist of a yoke 37, of suitable metallic construction, adapted to be placed upon the horizontal portion of said supporting-arm 36 and be there secured in different horizontal positions by a screw-bolt 38, screwing through one side thereof against said arm. Pending from said yoke, as clearly shown in Figs. 2 and 4, are two tubular spring-cases 39, which are rigidly secured by their upper ends to said yoke 37, the latter having perforations therethrough in a line with the bore of said cases. Within said spring-cases are placed suitable springs 40, either spiral or of rubber or other sutable material. (See Fig. 2.) Two plungers 41 are fitted to move vertically in said spring-cases 39, the lower ends of which bear against the upper ends of the springs therein, and the upper ends of said plungers are united by a saddle-plate 42, rigidly secured thereto, the upper side of said plate being curved, as shown in Fig. 2, and a clamp-plate 43 is secured against said saddle-plate by a bolt 44, passing through the latter and said clamp-plate, on the upper end of which is screwed a nut, as shown in Fig. 2. The said saddle-plate and clamp-plate are provided with corresponding grooves in their inner adjoining faces, which grooves are indicated by $o$, and serve to receive the portions of the saddle-frame which are attached to said saddle-plate. The said saddle-frame 45 is constructed, preferably, from a piece of heavy steel wire, and is made by first bending said wire to form a circular spring-base 46, and from thence extending said wire rearwardly (curving its two parts where it passes between the plate 42 and the clamp-plate 43) and beyond the latter, forming in each of said two parts $c$ $c$ a coil-spring $d$, and from said springs $d$ extending said wire parts slightly farther to the rearward and forming on the end of each a loop $m$, of oblong form, to provide thereby a support for the central portion of the metallic saddle-seat frame 47, said frame 47 being made, preferably, of sheet metal and having its central portion bent, as shown in Fig. 2, to partially inclose the said loops $m$ $m$, to which said frame is rigidly secured by bracing or other suitable means, if desired; or it may be simply hooked onto said loops. From said saddle-seat frame 47 the said wires are brought toward the center and extend in two lines $v$ $v$ toward the forward end of the saddle and terminating in a circular head 48, which serves to receive the upper end of a spring 49, of coiled wire or other suitable material, the base of said spring resting upon the said base 46. The said lines $v$ $v$ of the wire constituting a portion of said saddle-frame have their ends welded or brazed together at or near said circular head 48, and they constitute a spring-arm 50, flexibly supporting that part of the weight which is brought to bear upon the saddle at or near its front end, supplemented by the support thereto which is afforded by the spring 49, interposed between said arm 50 and the lower flexible arm of the frame which the said portions $c$ $c$ constitute, the coil-springs $d$ $d$ providing an easy and flexible support for the rear end of the saddle. The saddle-seat 51 is made, preferably, from leather, and has its rear end suitably riveted to the said seat-frame 47 and its front end attached in any suitable manner to the end of said spring-arm 50. From the above-described construction of said saddle it will be seen that its spring-frame is made from a single piece of suitable spring-wire, and that it affords the greatest ease of motion under the weight of the rider, and when supplemented by the interposition between its upper and lower forward portions of the spring 49 its resistance to deflection is more or less increased, and its flexibility is not impaired. The attachment of the saddle-frame by the said curved portion of its lower arm between the curved plates 42 and 43 admits of adjusting the saddle to varying longitudinal planes.

The saddle, although hereinbefore described in order to illustrate one desirable form of saddle, for the sustenance of which the saddle-supporting devices described are particularly well adapted, constitutes the subject-matter of a separate application for Letters Patent filed by me under date of February 26, 1889, Serial No. 301,268.

In operating bicycles of the class herein described and shown, to steer or guide them properly, (said machines being constructed with the front and rear wheels of substantially the same diameter,) it is found necessary to provide some interconnection between the handle-bars thereof and the spindle of the front-wheel fork, whereby the steering motion which is imparted by the rider to said handle-bars shall be reproduced in said front-wheel fork in a reduced degree. To this end the herein-described improvements in steering devices for safety-bicycles provide for supporting the handle-bar spindle rigidly on the said fork-spindle, but in a line to one side of the axis of the latter, as fully described below.

Fig. 7 illustrates in plan view a steering-lever 52, so constructed (as will be clearly understood) that the open head thereof may be placed on the upper end of the spindle of the fork 2 and be there clamped by the bolt 53 through its clamp end. The nut 9 is screwed onto the fork-spindle 3 against the head of the lever 52, thereby retaining it in place, and the shank of said lever extends rearwardly from said spindle, as clearly shown in Figs. 1 and 5. A steering-post 54 has its lower end clamped or otherwise suitably secured on the shank of said lever 52, whereby the said lower end of said post may be adjusted at different distances to one side of the axial line of the fork-spindle 3, as shown, and said post is entirely tubular, or has its upper end so formed, and the latter-named end is provided with a clamp 55, having a suitable bolt through its ears, as shown. The said upper end of the steering-post 54 is thus adapted to receive therein the lower end of the handle-bar spindle 56, the latter being there secured and vertically adjustable by means of the said clamp-fastening 55, said spindle 56 having attached to its upper end the handle-bar 57, having the usual handles thereon, as shown in Fig. 1.

By means of the above-described mode of connecting the handle-bar 57 with the front fork-spindle 3, by means of the steering-post 54 and spindle 56, having a lower end connection with the lever 52 to one side of the axial line of said spindle 3, the rotary motion which is imparted to the steering-post by the vibratory motion of the said handle-bar is reproduced in said fork-spindle to a reduced degree proportionate to the distance of separation between the axes of said fork-spindle and said steering-post, and thus a lesser degree of vibratory motion is imparted to the front wheel of the machine by the movement of the handle-bars than would be were the handle-bar spindle or handle-bars attached directly to the end of the fork-spindle, the result being that the rider is able to control the steering motion of the front wheel to such a degree that the machine is more easily guided and maintained in a right line of motion. If preferred, the handle-bar spindle 56 may be omitted and the handle-bar be attached directly to the upper end of the steering-post 54.

The above-referred-to brake-shoe 26 is operated toward and from the rim of the wheel A by means of a connecting-rod 58, pivoted by one end to said shoe and having a connection with the handle-bar 57, whereby by rocking the latter the brake-shoe is applied to the wheel or removed therefrom.

Referring to the above description of the saddle-frame, the front spring thereof 49 may be omitted by making the frame of somewhat heavier wire, so that the spring-arm 50 may provide sufficient resistance to support the front end of the saddle-seat, and when said intermediate spring is dispensed with the forwardly-projecting part of the frame under said spring may also be dispensed with.

What I claim as my invention is—

1. In combination with the fork-spindle and the hollow backbone-head fitting on said spindle, a cone-shaped sleeve on said spindle, an internally cone-shaped bushing in said head fitting said cone sleeve, and a nut on the end of said spindle holding said bushing and sleeve in operative relations, substantially as and for the purpose set forth.

2. In combination with the rear-fork arms constituting the frame of the machine between the two wheels thereof, a yoke 10, fixed on said frame, a shaft-box 12, attached to each end of said yoke and longitudinally adjustable thereon, and the crank and sprocket-wheel shaft supported in said boxes, substantially as set forth.

3. The rear-fork arms a a, constituting the frame of the machine between the two wheels thereof, a yoke 10, fixed on said frame and having at each end thereof a longitudinal groove, an adjusting screw-bolt 15, in line with said groove, a shaft-box 12, adjustably attached to each end of said yoke, having a rib thereon engaging with said groove, and the crank and sprocket-wheel shaft supported in said boxes, combined and operating substantially as set forth.

4. An improved support for the saddle-post and crank-shaft of a bicycle, consisting of the yoke 10, fixed to the frame of the machine, and the saddle-post B, fixed to said yoke, combined with the shaft-boxes 12, attached to the ends thereof, substantially as set forth.

5. A depressible mounting-step attached to the frame of the machine, having a leg whose lower end engages with the ground when said step is forced downward, a spring-case in which said leg moves and is supported, and a spring to throw said step upward, combined and operating substantially as set forth.

6. A depressible mounting-step attached to the frame of the machine and normally inclined to the plane of rotation of the wheels of the machine, having a leg whose lower end engages with the ground when said step is moved downward, a spring-case in which said leg moves and is supported, and a spring to throw said step upward, combined and operating substantially as set forth.

7. In combination with an arm 36, on which the saddle is supported, a yoke 37, attached to said arm, two tubular spring-cases pending from said yoke containing springs, substantially as described, two plungers 41, having a vertical movement against said springs, a saddle-plate 42, rigidly uniting the upper ends of said plungers, and a saddle attached to said plate, substantially as set forth.

8. Improved steering devices for bicycles, consisting of the combination, with the front-fork spindle thereof and the handle-bar, of a steering-post and a lever, substantially as described, forming an intermediate connection between said handle-bar and fork-spindle, substantially as set forth.

9. Improved steering devices for bicycles, consisting of the combination, with the front-fork spindle thereof and the handle-bar, of a steering-post and a lever, substantially as described, forming an intermediate connection between said handle-bar and fork-spindle, said steering-post being adjustable on said lever from and toward the axis of said fork-spindle, substantially as set forth.

10. In combination with the fork-spindle, the laterally-extending lever 52, secured to said spindle, the steering-post 54, attached to said lever and adjustable longitudinally thereon, the handle-bar spindle 56, adjustable vertically in said post, and the handle-bar 57, substantially as set forth.

GEO. T. WARWICK.

Witnesses:
H. A. CHAPIN,
G. M. CHAMBERLAIN.